June 19, 1928.  1,673,872

K. HUESSENER

REGULATION OF FLOW OF FLUIDS

Filed Feb. 7, 1925   4 Sheets-Sheet 1

WITNESS
J. Herbert Bradley

INVENTOR
Kurt Huessener
by Dennis S. Wolcott

June 19, 1928.
K. HUESSENER
1,673,872
REGULATION OF FLOW OF FLUIDS
Filed Feb. 7, 1925   4 Sheets-Sheet 2
FIG. 2.
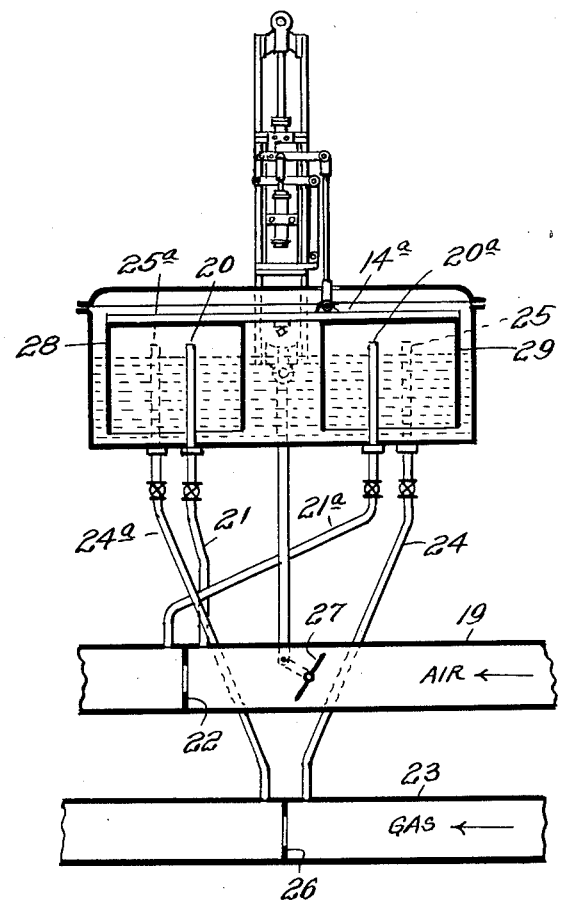
FIG. 2ª
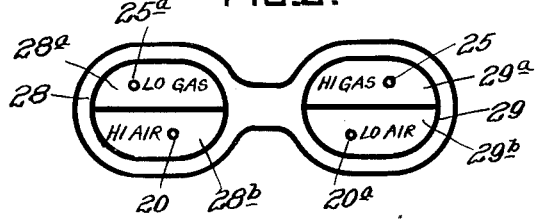
WITNESS
J. Herbert Bradley
INVENTOR
Kurt Huessener
by Darwin S. Wolcott
Atty

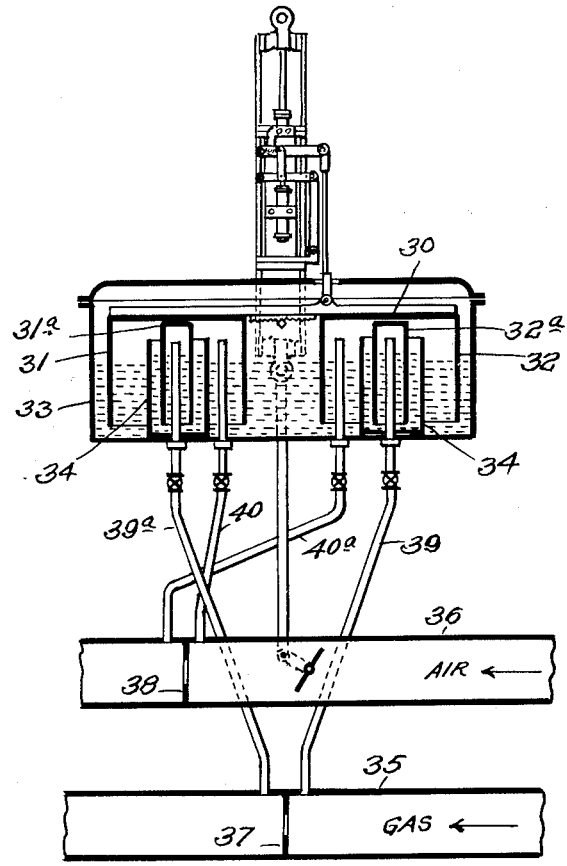
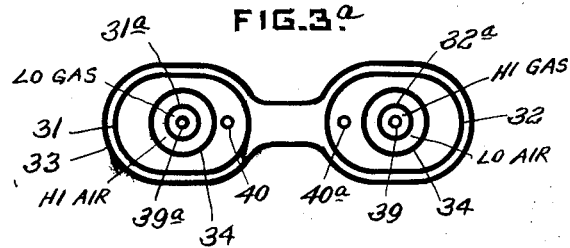

June 19, 1928. 1,673,872

K. HUESSENER

REGULATION OF FLOW OF FLUIDS

Filed Feb. 7, 1925 4 Sheets-Sheet 4

WITNESS
J. Herbert Bradley.

INVENTOR
Kurt Huessener
by Dennis & Scott
atty

Patented June 19, 1928.

1,673,872

UNITED STATES PATENT OFFICE.

KURT HUESSENER, OF PITTSBURGH, PENNSYLVANIA; JULIE HUESSENER EXECUTRIX OF SAID KURT HUESSENER, DECEASED.

REGULATION OF FLOW OF FLUIDS.

Application filed February 7, 1925. Serial No. 7,635.

The invention described and claimed herein relates to the regulation of the rate of flow of fluid through a conduit, by and in accordance with the rate of flow of a fluid through another conduit, said conduit extending from sources of supply, one of which may be substantially constant and the other variable, or both sources may be variable, the improvement being especially applicable for effecting the mixture in proper proportions of two gases or a gas and a liquid.

Regulation of the flow of one fluid by another has heretofore been effected by and in accordance with the static pressure of the regulating fluid, but it has been found that when the fluid is in motion the static pressure is influenced to a greater or less degree by the rate of flow, and hence exact regulation by static pressure is difficult, if not impracticable.

The object of the invention described and claimed herein is to provide for the regulation of the supply of one of the fluids by and in accordance with changes in the rate of flow of the other fluid to the point of use or mixture. The invention is hereinafter more fully described and claimed.

Figure 1:
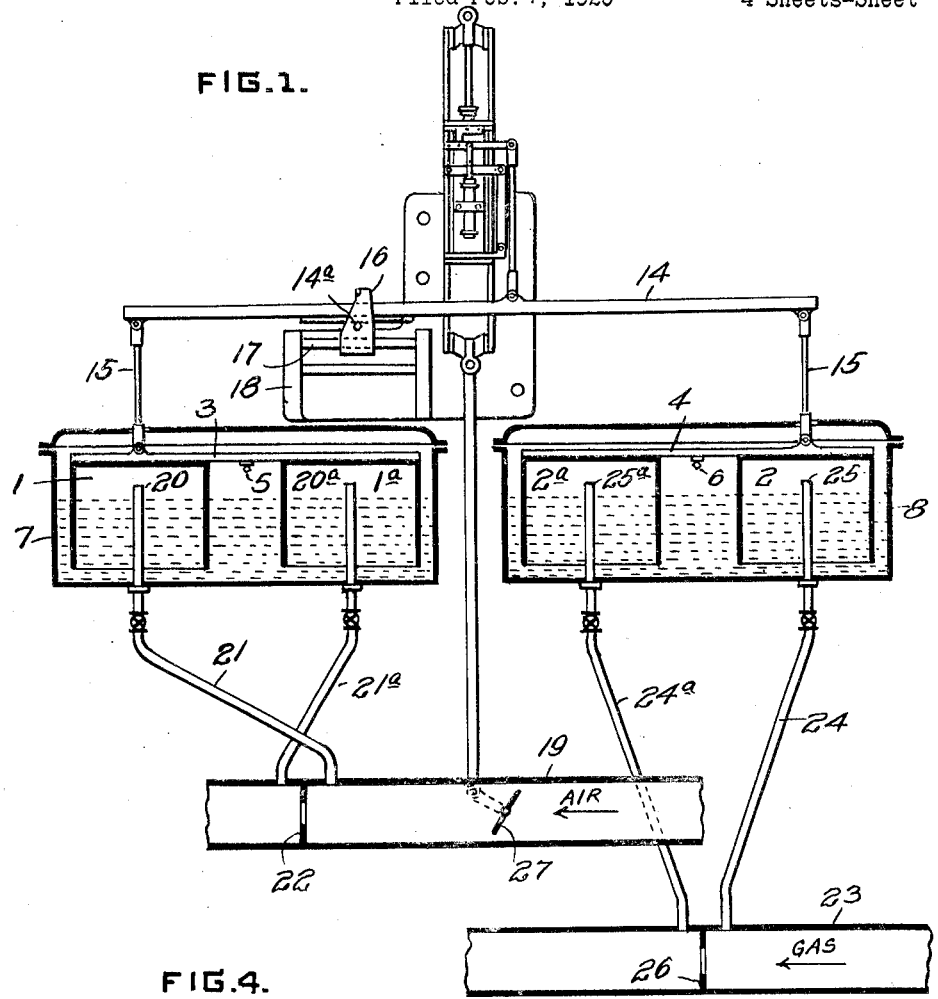
Figure 4:
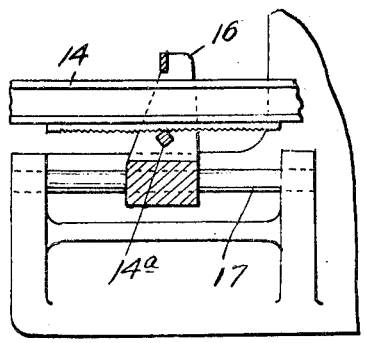
Figure 5:
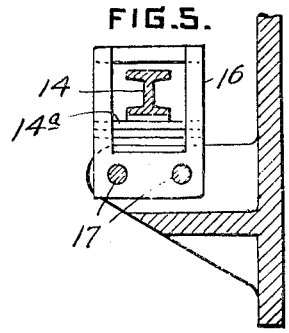
Figure 6:
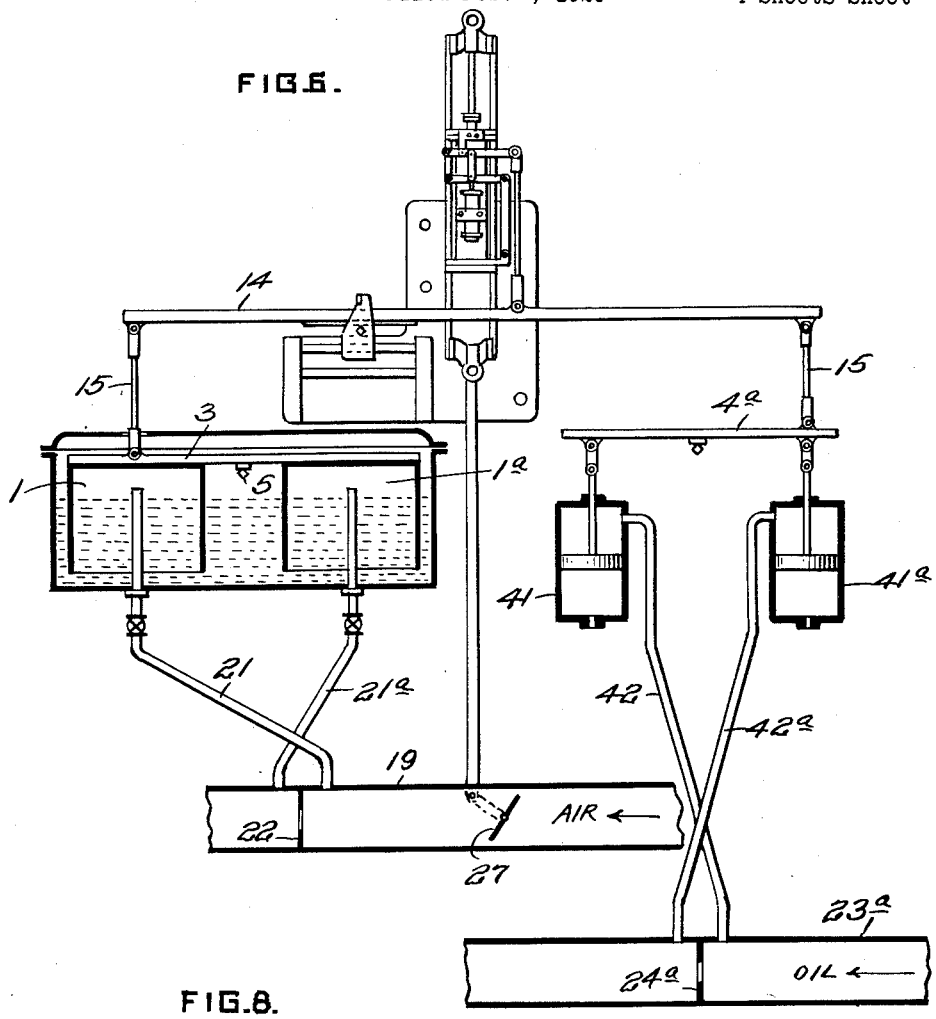
Figure 8:
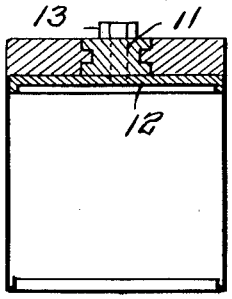
Figure 7:
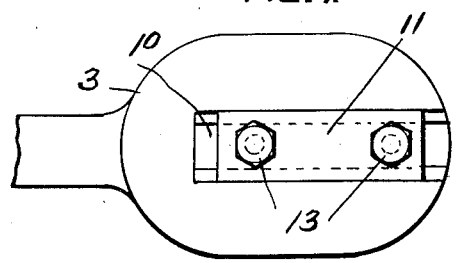

In the accompanying drawings forming a part of this specification, Fig. 1 is a diagrammatic view illustrating a form of apparatus adapted to the practice of the invention claimed herein; Figs. 2 and 3 are similar views illustrating modifications of the construction shown in Fig. 1; Figs. 2$^a$ and 3$^a$ are diagrammatic plan views illustrating the relative arrangements of the bells and the manner of introducing the gas in the construction shown in Figs. 2 and 3; Figs. 4 and 5 are detail views of the manner of supporting the lever carrying the bells shown in Fig. 1; Fig. 6 is a view similar to Fig. 1 illustrating a form of apparatus suitable for mixing a liquid and a gas; Figs. 7 and 8 are views showing in plan, section and side elevation, a suitable construction for mounting the bells on the levers.

In the embodiment of the improvement shown herein in Fig. 1, pairs of bells 1, 1$^a$, and 2, 2$^a$, are suspended from opposite ends of levers 3 and 4 having their fulcra 5 and 6 so located with reference to tanks 7 and 8 that the lower open ends of the bells will be submerged a distance below the liquid, e. g., oil in the tanks, the depth of submergence of the bells being dependent on the pressure of the gases to be mixed. It is preferred that the bells should be so adjustably mounted on their supporting levers, that their positions relative to the fulcra can be varied as hereinafter described. A suitable construction to that end is shown in Figs. 7 and 8, and consists in forming slots 10 in the levers for the reception of blocks secured to the closed ends of the bells. In order to prevent accidental shifting of the bells, the blocks are formed in sections 11 and 12, the latter having its edges underlying ribs projecting from the walls of the slot, while the edges of the section 11 will bear on top of the ribs, so that by tightening the bolts 13, the bells will be firmly held in the desired position.

A lever 14 has its ends connected by links 15 or other suitable means to the levers 3 and 4 at points suitable distances from their fulcra 5 and 6. As shown in Fig. 1, the lever 14 is supported by an adjustable fulcrum 14$^a$ whereby the effective lengths of the portions of the lever extending from the fulcrum can be varied as hereinafter described. In the construction shown in Fig. 1, the fulcrum bar 14$^a$ is carried by a slide 16 movably mounted on rods 17 secured to the frame 18, said frame and rods being so arranged that the movement of the slide will be parallel with the lever 14 which is provided on its underside with notches for the reception of the knife edge of the fulcrum bar 14$^a$. A change in the effective lengths of the portions of the lever on opposite sides of the fulcrum is effected by raising the lever and shifting the slide 16.

Connections from one of the supply pipes or conduits, as 19, to the nozzles 20 and 20$^a$ projecting up into the bells 1 and 1$^a$ above the level of the liquid therein, are formed by pipes 21 and 21$^a$ extending from points on opposite sides of the disc 22 arranged in the conduit 19 and having an orifice therethrough of a diameter less than that of the supply pipe. As is well known, the pressure of the gas after passing through the orifice will be less than that on the opposite or supply side of the orifice. This difference between the pressures on opposite sides of the orifice will be proportioned to the rate of flow of gas through the supply conduit. The bells 2 and 2ᵃ are similarly connected to the conduit 23 supplying the other gas by pipes 24, 24ᵃ, and nozzles 25 and 25ᵃ, the pipes 24 and 24ᵃ being connected to the conduit 23 on opposite sides of the orifice disc 26 in the conduit 23. The connections from the conduit 19 to the bells 1 and 1ᵃ and those from the conduit 23 to the bells 22, 22ᵃ, are symmetrical, and the points of connection of the levers 3 and 4 to the respective ends of the lever 14 are preferably offset from the fulcra of the levers 3 and 4 towards ends of the levers carrying the bells connected to the supply sides of the orifices in the conduits 19 and 23.

By reference to Fig. 1 it will be seen that the relative vertical positions of the bells on the levers 3 and 4 is dependent on the difference of pressure on opposite sides of the orifices in the supply conduits and in practice it is preferred that the bells of each pair should be adjusted to such positions relative to their respective fulcra 5 and 6 that notwithstanding the difference of pressure, the bells of each pair of the levers 3 and 4 will be in substantially horizontal positions.

And further, it is preferred that the fulcrum 16 should so be adjusted along the lever 14, that although the differential pressure acting on one pair of the bells may be greater than that affecting the other pair of bells, the lever 14 will be in a horizontal position. It will be understood that the adjustments of positions of the bells relative to the fulcra of the levers carrying the same and the positions of the fulcrum of the lever 14 will be made when the flow of the fluids through the supply conduits are normal, each supplying the desired quantity of gas.

It will be understood that, in constructing and adjusting the mechanisms, the orifices in the respective conduits are by preference made of such dimensions that the pressure drop in the respective conduits will bear a certain relation to each other in the proportions for which the machine is adjusted. Suppose for example, that blast furnace gas is being supplied through the conduit 26 at a rate or 10,000 cubit feet per hour, and air was being supplied at the rate of 7,000 cubic feet per hour for the combustion of the gas, the orifices in the respective conduits should be of such dimensions that the pressure drop through the orifice would be the same in both conduits, as for example, one inch, while the respective rates of flow were maintained. In case the rate of flow of gas in conduit 23 should increase so that the pressure drop through the orifice rises to an inch and a half, the rate of flow of air should be proportionately increased by shifting the means employed for controlling the flow of air, such means in the connection shown consisting of a damper 27 in the air conduit 19. By this increased rate of flow of gas, the pressures in the bells 2, 2ᵃ, will be increased, the increase in the bell 2 being the greater proportionately to the increased rate of flow, so that the bell 2 will move up and the bell 2ᵃ will move down. The shifting of the lever 4 due to the relative movements of the bells 2, 2ᵃ, will raise the right hand end of the lever 14, such movement being resisted by the differential of the pressures in the bells 1 and 1ᵃ. The above described movements are utilized to shift the damper 27. While suitable construction of motor controllable by the lever 14 may be employed, it is preferred to employ the mechanism described and claimed in Letters Patent No. 1,371,243, granted March 15, 1921, to John M. Hopwood. The shifting of the damper will permit the increase in the flow of air through the conduit 19 until the drop of pressure through the orifice in said conduit is substantially equal to the pressure drop in the conduit 23. When the flow of gas through the conduit 23 moves toward normal, the drop of pressure through the orifice in the conduit 19 becomes greater than the drop of pressure in the gas conduit and air differential will cause a reversal of the operations above described and the damper 27 will be moved to reduce the flow of air.

In Fig. 2 is shown a construction employing two bells 28 and 29 enclosed in a tank, each of said bells having two compartments 28ᵃ and 28ᵇ, and 29ᵃ and 29ᵇ, respectively. The supply conduits are so connected to the bells that the bell at one end of the bell-carrying lever 14ᵃ will be subjected to the sum of the high pressure of one fluid and the lower pressure of the second fluid, while the bell at the opposite end of said lever is subjected to the sum of the high pressure of the second fluid and the low pressure of the first fluid. Suppose for example it is desired to utilize blast furnace gas and to mix therewith suitable quantity of air for combustion, the pipe 24 extending from the high pressure side of the orifice in the gas conduit 23 connects with the nozzle 25 projecting up into compartment 29ᵃ of the bell 29, but the pipe 24ᵃ extending from the low pressure side of orifice 26 in the gas conduit 23 connects with the chamber 28ᵃ of the bell 28. Air is conducted from the high pressure side of the orifice in conduit 19 by a pipe 21 to the nozzle 20 in the compartment 28ᵇ in the bell 28, while a pipe 21ᵃ extends from the lower pressure of the orifice 22 in conduit 19 to a nozzle 20ᵃ projecting into compartment 29ᵇ in the bell 29. It will be understood that in the construction shown in Fig. 2, the bells are adjustable along the lever 14ᵃ as shown in Fig. 1.

In Fig. 3 is shown a construction adapted for use when there is a large difference between the respective quantities of gases to be mixed and hence there will be a large differential between the rates of flow of the gases. On the opposite ends of the lever 30 are secured pairs of bells 31, 31ª and 32, 32ª, the bells 31ª and 32ª being of smaller diameter than the bells 31 or 32, which enclose the smaller bells. These bells are suspended from the lever and extend down a suitable distance into a tank 33 containing a suitable liquid as oil. The smaller bells 31ª and 32ª are not immersed in the oil, but in a liquid having a greater specific gravity than the oil, such as mercury, contained in open topped cups 34 arranged in the tank 33. The connections from the conduits 35 and 36 to the respective bells are similar to that shown in Fig. 2. The conduits are provided with orifices 37 and 38 having such areas relative to the normal rates of flow of the gases, that the drops of pressure through such orifices will be in relation to the size of the bells. In Figs. 3, 3ª, is shown a construction of apparatus adapted to effect a proper combustible mixture between a gas from a source where the pressure is normally high and variable and air under a substantially constant pressure which is sufficiently high to furnish sufficient air, not only when gas at its source is at normal pressure, but also at the highest probable pressure. As therein shown, pipes 39, 39ª, extend from points on opposite sides of the orifice 37 up into the bells 31ª, 32ª, which are immersed in mercury contained in the cups 34, as stated. Pipes 40, 40ª extend from opposite sides of the orifice 38 in the air conduit 36 into the bells 31 and 32 which as before stated are immersed in oil or some liquid having a specific gravity bearing a ratio to the specific gravity of mercury or other liquid in the cups 34, substantially to the ratio between the pressures of the gas and air. It will be observed that the connections from the conduits to the several bells is substantially the same as in the construction shown in Fig. 2.

The construction shown in Fig. 6 embodies a modification of the construction shown in Fig. 1, whereby a liquid and a gas may be mixed as for example, oil and air, for the combustion of the oil. As described in connection with Fig. 1, points of the conduit 19 on opposite sides of the orific 22 are connected with the bells 1, 1ª, suspended from opposite ends of the lever 3 which is connected by a link 15 to one end of the lever 14 having an adjustable fulcrum 14ª. The opposite end of the lever 14 is connected by a link 15 to a lever 4ª.

The cylinders 41, 41ª, have their pistonrods connected to the lever 4ª, said blocks being preferably adjustable as described in connection with the mounting of the bells on the lever 4 in the construction shown in Fig. 1. The oil conduit 23ª is provided with a plate 24ª having an orifice and from points on opposite sides of the orifice connections extend to the respective cylinders, the pipe 42 extending from the high pressure sides of the orifice to the cylinder 41 and the pipe 42ª from the low pressure side of the orifice to the cylinder 41ª. This arrangement ensures in case of an increase of the rate of flow of oil, a movement of the end of lever 14 corresponding to the movement imparted to said lever in case of an increase of flow of gas when employing the construction shown in Fig. 1.

I claim herein as my invention:

1. In an apparatus for maintaining a desired proportionate rate of flow of fluids, the combination of conduits for conducting the fluids and having portions of reduced cross-sectional areas, pairs of bells having their open ends submerged in a suitable liquid, connections extending from opposite sides of the reduced portions of the respective conduits into said bells, said connections being so arranged that the differentials between the pressures in the respective conduits will operate to shift both pairs of bells, in the same direction, a lever connected at points on opposite sides of its fulcrum to the respective pairs of bells, one of said conduits being provided with means on one side of its reduced portion for regulating the flow of fluid through such conduit, and means operative by and in accordance with the movements of the lever for shifting the regulating means.

2. In an apparatus for maintaining a desired proportionate rate of flow of fluids, the combination of a lever, a pair of bells connected to the lever on each side of its fulcrum, conduits for conducting the fluid, said conduits being provided with orifices havings areas less than the cross-sectional area of the conduits, connections extending from the high and low pressure sides of the orifice in one conduit to the respective bells of one pair, connections extending from the high and low pressure sides of the orifice in the other conduit to the respective bells of the other pair, and means for regulating the flow of fluid in one conduit located on one side of the orifice in the said conduit and adapted to be shifted by said lever.

3. In an apparatus for maintaining a desired proportionate rate of flow of fluids, the combination of conduits for conducting the fluids and having portions of reduced cross sectional areas, pairs of bells having their open ends submerged in a suitable liquid, connections extending from opposite sides of the reduced portions of the respective conduits into said bells, said connections being so arranged that the differentials between the pressures in the respective conduits will operate to shift both pairs of bells in the same direction, a lever having an adjustable fulcrum connected at points on opposite sides of its fulcrum to the respective pairs of bells, one of said conduits being provided with means on one side of its reduced portion for regulating the flow of fluid through such conduit, and means operative by and in accordance with the movements of the lever for shifting the regulating means.

In testimony whereof, I have hereunto set my hand.

KURT HUESSENER.